United States Patent [19]

Eisenhauer

[11] Patent Number: 5,118,927
[45] Date of Patent: Jun. 2, 1992

[54] PRECOOKED FOOD WARMER UTILIZING IMMERSIBLE SWORD LIKE HEAT TRANSFER MEMBERS

[75] Inventor: Hartmut Eisenhauer, Michelfeld, Fed. Rep. of Germany

[73] Assignee: Stego Elektrotechnik GmbH, Fed. Rep. of Germany

[21] Appl. No.: 626,265

[22] Filed: Dec. 12, 1990

[30] Foreign Application Priority Data

Dec. 14, 1989 [DE] Fed. Rep. of Germany ....... 3941331

[51] Int. Cl.⁵ .................. A47J 36/26; H05B 3/68; A61J 9/00; A23L 1/00
[52] U.S. Cl. .................... 219/437; 219/430; 219/523; 219/530; 219/387; 219/505; 165/132; 99/447
[58] Field of Search ............... 219/435–442, 219/430, 505, 523, 521, 385, 387; 392/441, 444–445, 448, 502; 126/263, 246, 261, 373–375; 165/132; 432/225, 210; 99/447

[56] References Cited

U.S. PATENT DOCUMENTS

| 2,483,979 | 10/1949 | Morrill | 219/437 |
| 2,835,480 | 5/1958 | Perez | 392/394 |
| 2,918,561 | 12/1959 | Perez | 219/523 |
| 3,064,113 | 11/1962 | Pitrone | 219/437 |
| 3,536,893 | 10/1970 | Cranley | 219/523 |
| 4,105,895 | 8/1978 | Kennedy | 219/530 |
| 4,131,785 | 12/1978 | Shutt | 392/458 |
| 4,324,974 | 4/1982 | Steiner et al. | 219/523 |

FOREIGN PATENT DOCUMENTS

| 845260 | 7/1952 | Fed. Rep. of Germany | 219/523 |
| 3149119A1 | 7/1983 | Fed. Rep. of Germany. | |
| 8314558.7 | 8/1984 | Fed. Rep. of Germany. | |

Primary Examiner—Bruce A. Reynolds
Assistant Examiner—John A. Jeffery
Attorney, Agent, or Firm—Marshall, O'Toole, Gerstein, Murray & Bicknell

[57] ABSTRACT

A precooked-food warmer for baby and diet food which is contained in an openable, rigid container comprises a housing that can be fixed to the container and in which is located an electrical heating unit. The unit is equipped with connectors such that energy is supplied to the unit and with a heat-conducting means to transfer heat from the heating unit to liquid or semi-liquid food in the container. A transfer member of a rigid heat-conducting material that is immersible in the food and is detachable from the heating unit is also provided. Preferably, the transfer member defines at least one sword-like section of large surface area that is immersible in the food.

15 Claims, 4 Drawing Sheets

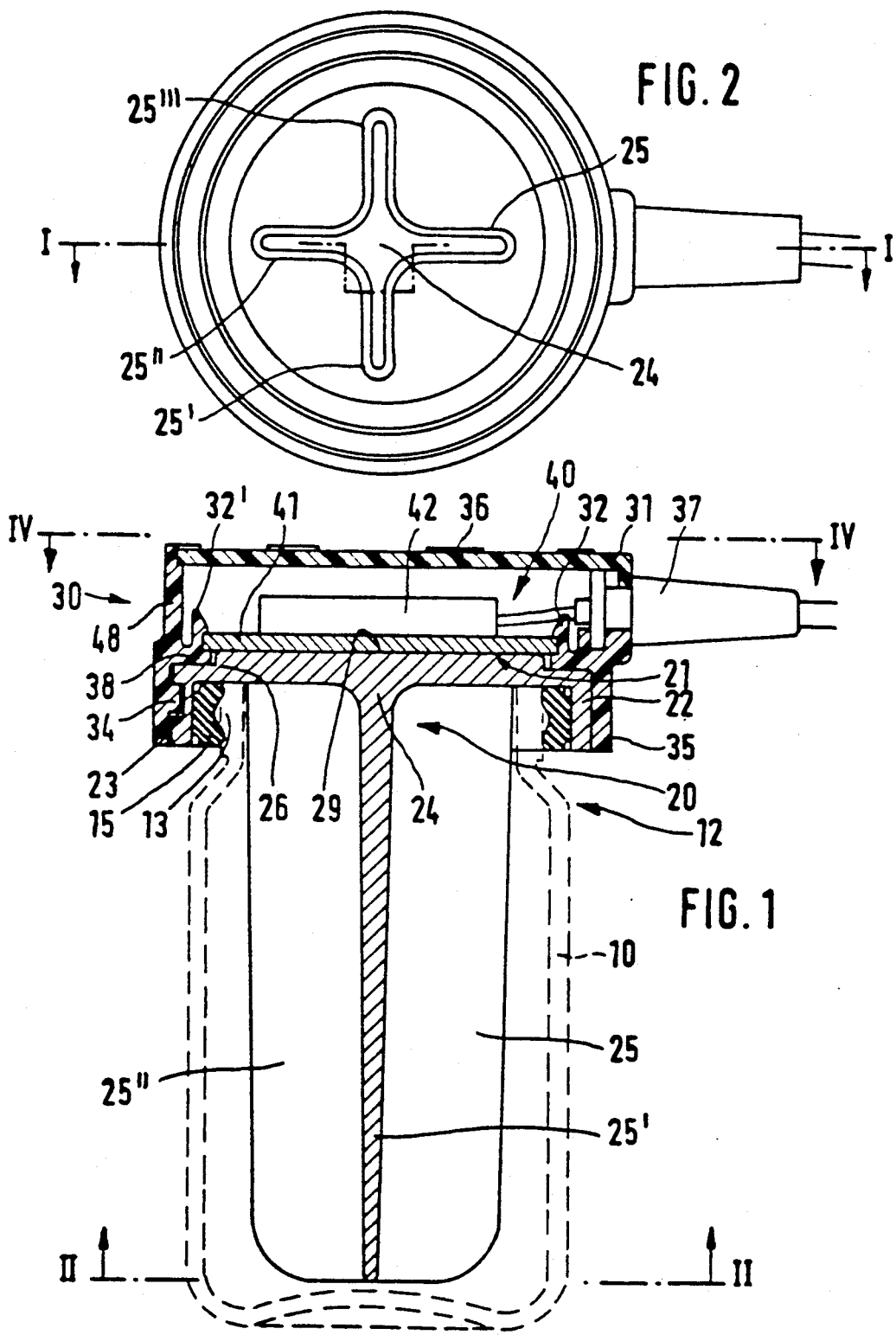

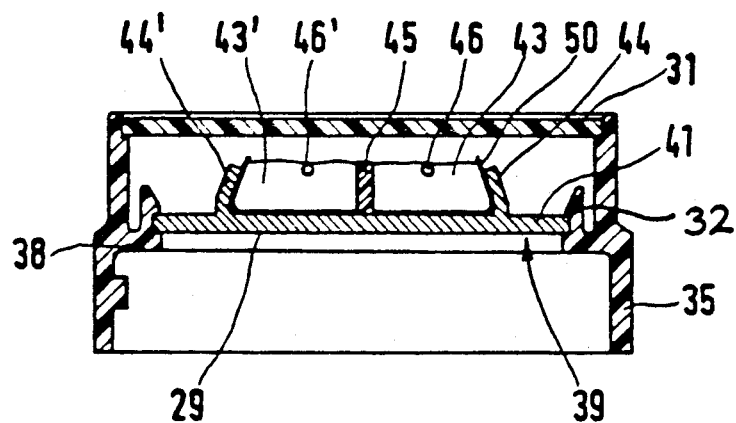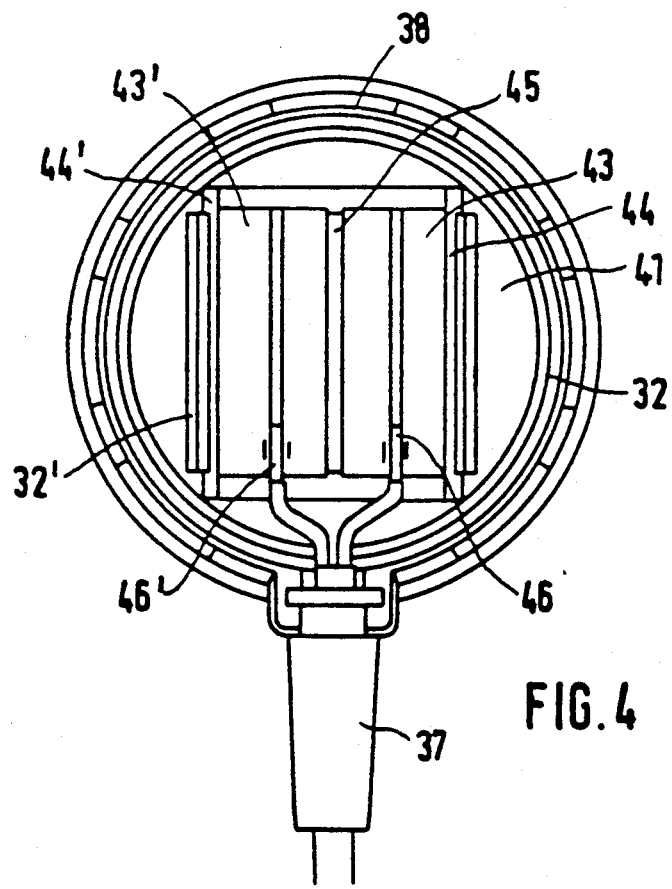

PRECOOKED FOOD WARMER UTILIZING IMMERSIBLE SWORD LIKE HEAT TRANSFER MEMBERS

FIELD OF THE INVENTION

The invention relates to a precooked-food warmer. In particular, the invention relates to a device to warm up baby and diet foods which are commercially available in jars closed with a screw-top.

BACKGROUND OF THE INVENTION

Precooked-food warmers are known in which the heating unit comprises a housing with a cup-shaped interior space open at the top into which the container with the food it contains is placed. The heating unit warms up the wall of the cup and the cup is filled with water so that the heat is conducted from the wall of the cup to the container.

The disadvantages of precooked-food warmers of this kind are that (i) the heat is transferred very slowly through the wall of the container into the food within, and (ii) it is essential for there to be water in the cup to conduct the heat. This makes such precooked-food warmers inconvenient and even, under some circumstances, dangerous to use. In addition, for travelling, especially for use in a car, such precooked-food warmers are impracticable.

From patent DE 84 14 558 Ul a precooked-food warmer is disclosed in which the heat is transferred without water, so that the disadvantages previously described are not present. However, the device is extremely difficult to clean. This is a considerable disadvantage, immaculate cleanliness being particularly important where baby food is concerned.

SUMMARY OF THE INVENTION

The object of the present invention is to provide a precooked-food warmer in which simple, satisfactory cleanliness is ensured while preserving a good transfer of heat.

According to the present invention there is provided a precooked-food warmer for baby and diet food, which is contained in an openable, rigid container, comprising a housing that can be fixed to the container, an electrical heating unit located within the housing, connectors by means of which energy is supplied to the heating unit, heat-conducting means to transfer heat from the heating unit to liquid or semi-liquid food in the container, and a transfer member of a rigid, heat-conducting material that is immersible in the food and is detachable from the heating unit.

An essential feature of the invention is, therefore, the contact between the food and the heat-transfer member, which is preferably made of metal (e.g. aluminum) and coated (teflonized) on its outer surface with a food-compatible material (e.g. polytetrafluorethylene). The member is detachable, from the heating unit so that it can be washed after use or even boiled. The heating unit, which does not come into contact with the food, is uncoupled during this process.

Because the housing and hence the transfer member can be firmly attached to the container, the precooked-food warmer can also be used while travelling in an automobile. There is no danger, because it is not necessary to fill the device with water for heat conduction.

The transfer element is preferably of sword-like construction with sections that increase its surface area so that it is immersible in the food product. Preferably, the sections comprise three or four outward-projecting vanes positioned in a star arrangement around a central section, the central section tapering toward a free end of the transfer member, which is immersible in the food. This construction provides a very large heat-transferring surface on one hand, while on the other hand keeps the displacement volume of the element small.

The transfer member preferably has a coupling surface on which the heating unit can be set, so that there is contact over a large area with a corresponding opposed surface of the heating unit. Hence no direct screw connections are provided between the heating unit and the transfer element.

The separate housing is preferably made of a low thermal conductivity material, such as plastics, that conducts heat poorly. The heating unit is built into the housing in such a way that none of its heatable parts extends beyond the outer contour of the housing. After use, when the separate housing containing the still-hot heating unit is removed from the transfer member, the housing can be set aside with no danger of injury.

Devices may also be provided that enable the housing, together with the transfer member, to be attached to the container in a watertight manner. These devices can comprise a sealing rim attached to the transfer element and lined by a sealing ring, which forms a tight seal between the rim and a screw-thread on the container. The housing and the transfer member are provided with devices permitting the two parts to be locked together. In this case, therefore, before the apparatus is put to use the transfer member is first connected to the housing, forming an easily handled unit, and then the entire apparatus is attached to the food container. This procedure is reversed to remove the container from the warmer.

The sealing rim can be constructed in one piece with the heat-conducting material of the transfer member. In this case the housing should define a section that extends over and covers the outside of the sealing rim, so that when the apparatus is grasped one cannot come into contact with the hot material of the transfer element.

In another embodiment of the invention, the sealing rim forms part of an outer ring, by means of which the housing, the transfer member and the container can all be held together. In this case the outer ring is provided either as an inseparable part of the transfer element, that is immovably attached to it or moulded integrally with it, or as a separate piece, by means of which the transfer element is flanged to the housing that incorporates the heating unit. Here the connection will preferably consist of a kind of bayonet or screw-type closure, so that a turning movement is necessary for assembly and disassembly. The closure is further constructed so that when the transfer member is connected to the housing, the transfer element is firmly pressed against the heating unit. The turning direction by which the screw-type or bayonet closure is opened is made so that as the device is placed on and removed from a screw-top container, this rotation does not loosen the connection between the transfer member and the housing (left-handed threading, locking).

In a preferred embodiment of the invention, the sealing ring is constructed with an elongated lip which extends from the threaded neck of the container toward a shoulder of the container and rests on the shoulder so as to make an essentially tight seal. A space or chamber is therefore defined between the lip and the container. This configuration ensures that any food that may leak from the container will be caught.

Preferably also, the housing defines an essentially closed internal space, the floor of which defines an opening. The heating unit has an end surface and is fixed to the floor in the internal space of the housing such that the opening is essentially sealed shut by this end surface. Therefore, the only "hot part" accessible from the outside is the part of the end surface of the heating unit that is exposed in the opening. This area makes contact with a corresponding area of the transfer element. In this way the heating unit can be encapsulated in the housing in an essentially moistureproof manner. It is advantageous for the housing to be made in two pieces, one of which comprises a rim that can be closed off at one end by a lid. In the housing, specifically on its floor, there is a clamp arrangement comprising claws that project into the interior space. These claws are formed such that when the heating unit is pressed into the clamp arrangement it snaps into place and is held there. After the heating unit has been thus incorporated, the lid is set on the rim of the housing and can be permanently attached to it, e.g. by means of an adhesive or by welding.

Preferably also, the heating unit comprises a PTC element which is a semiconductor heater, the resistance of which rises abruptly when a specified temperature is reached. This characteristic ensures that the element will operate with high electrical power until a predetermined temperature has been reached and from then on will operate with very low power. This mode of operation ensures thermostatic behaviour. The PTC element is preferably fastened to a mounting plate.

The thermal conduction is especially efficient when the PTC element is clamped between two narrow sides of coupling blocks, the perpendicular larger-area sides of which rest on the mounting plate. With this arrangement, heat is conducted uniformly away from both surfaces of the PTC element and this in turn ensures that the specified transition temperature of the PTC element is precisely maintained or maintained by the entire heating unit. Furthermore, the heat conduction, which occurs "around a corner", so to speak, is very good because of the available areas. The heating efficiency achieved in this way is therefore optimal.

Power is supplied to the PTC element directly by way of the coupling blocks. For this purpose, each of the coupling blocks is connected to one conductor of the supply cable, the entire arrangement, that is the coupling blocks and the PTC element, being insulated from the mounting plate.

To fix the PTC element between the coupling blocks, a mounting plate with a flat surface between two essentially vertically upward-projecting claws is most suitable to use. The coupling blocks, with the PTC element between them, are placed between the two claws, the distance between which has been chosen to match the dimensions of the assembled coupling blocks and PTC element. For insulation, an electrically non-conducting plastic sheet is placed between the coupling blocks and PTC element assembly and the mounting plate with its claws. After the assembly has been put into place, the claws are bent inward so that the two coupling blocks are compressed, clamping the PTC element between them, and pressed against the substrate and, the mounting plate. For this purpose, the coupling blocks will preferably be shaped with slanting edges on the side away from the PTC element, such that after the claws have been bent together they exert downward pressure on the coupling blocks, pressing them against the mounting plate.

BRIEF DESCRIPTION OF THE DRAWINGS

FIG. 1 is a longitudinal section view, along the line I—I in FIG. 2, of a first embodiment of the invention;

FIG. 2 is a view along the line II—II in FIG. 1;

FIG. 3 is a longitudinal sectional view through a housing with an incorporated heating unit;

FIG. 4 is a view along the line IV—IV in FIG. 1 but without the lid of the housing;

DESCRIPTION OF THE PREFERRED EMBODIMENTS

Figure 5:
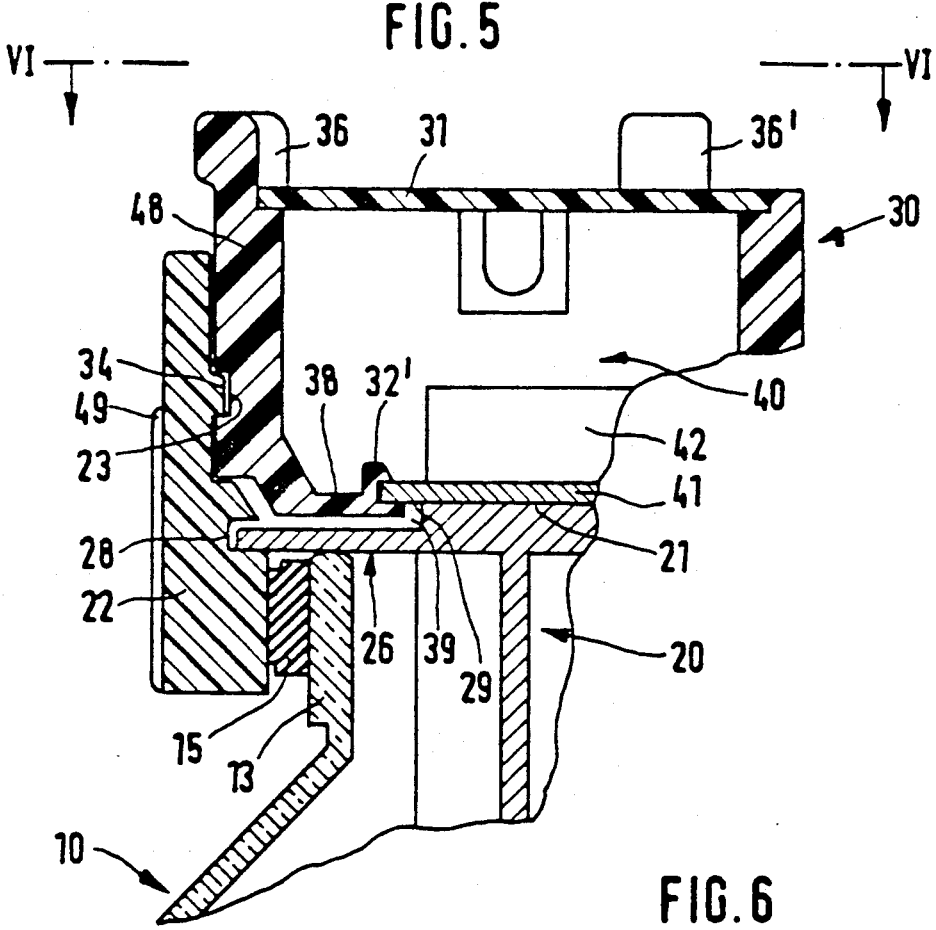
FIG. 5 is a partial longitudinal sectional view along the line V—V in FIG. 6 of a second embodiment of the invention.

As can be seen in FIGS. 1 to 4, the first embodiment of the invention comprises a housing 30 that encloses a heating unit 40, the heating element 42 of which is connected to a heat-transfer member 20. The transfer member 20 in this embodiment is constructed with four vanes 25'-25''', projecting radially from a central section 24 to form a star shape. The central section 24 tapers downward from the upper coupling surface 21 shown in FIG. 1. The thickness of the vanes 25'-25''' also tapers downward. The cross-sectional area is thereby reduced to correspond with the amount of heat to be transferred, and at the same time the volume displaced by the transfer member 20 is minimized.

At its upper end, which is bounded by the coupling surface 21, the transfer member 20 comprises a plate-shaped section with a sealing rim 22 which extends downward toward the end of the transfer member. The annular shape and the dimensions of the sealing rim 22 are such that, when lined by a sealing ring 15, it can be set or screwed onto the screw-thread 13 of a container 10 and then remains firmly attached. When the transfer member is so positioned, the interior space of the container 10 is tightly sealed by the transfer member 20 (or its end part), because a corresponding surface 26 of the transfer member 20 is firmly seated on the upper rim of the container 10.

The housing 30 is basically radially symmetrical and has a floor 38, in the middle of which, concentric with the outer contour, there is an opening 39. The upper end surface of the housing 30 is formed by a lid 31, which is set on the edge of the body of the housing and firmly attached to the latter, for example by welding or by means of an adhesive.

From the floor 38, at the edge of the opening 39, a pair of claws 32, 32' project into the interior space of the housing so formed. Each claw bears a hook on the side facing the other claw.

The edges of a mounting plate 41 are inserted into the claws 32, 32'. This mounting plate 41 is preferably constructed of aluminum or a material with similarly high heat conductance, a continuous casting procedure being particularly suitable for its manufacture.

The inner side of the mounting plate 41 (the lower side in the figures) is an essentially planar end surface 29, which (seen from below in FIG. 3) is exposed by the opening 39.

On its upper side the mounting plate 41 includes upward-projecting claws 44, 44', which in the original state of the mounting plate 41, that is before incorporation of the components that together form the heating unit 42, rise vertically upward from the mounting plate 41.

The distances separating the two claws 44, 44' are such that the U-shaped interior space they enclose can first be lined with a sheet of electrically insulating material 50, after which two coupling blocks 43, 43' with at least one PTC element 45 between them is inserted. The coupling blocks 43, 43' have slots in their upper surfaces into which leads 46, 46' to supply electrical current are inserted and then clamped in place by suitable deformation of the material.

The sides of the coupling blocks 43, 43' away from the PTC element 45 taper upward as shown in FIG. 3, so that after the insulating sheet 50, the coupling blocks 43, 43' and the PTC element 45 have been placed between the claws 44, 44' the latter is bent inward. This arrangement ensures that the coupling blocks 43, 43' will be particularly securely seated on the mounting plate 41 while simultaneously clamping the PTC element 45 between them.

The power-supply leads 46, 46' pass (in a single cable) through a connector socket 37 to a plug (not shown). The connector socket 37 is seated in a suitably shaped hole in the housing rim 48 and in an end part of the lid 31 of the housing 30.

In the lower part of the housing 30 an outer ring such as a rim 35 extends downward far enough to cover the sealing rim 22. This arrangement ensures that no part of the transfer member 20 that becomes hot when the apparatus is in operation can be accidentally touched by a user.

The housing 30 is attached to the transfer member 20 by a bayonet-type closure comprising a tongue 34, which projects radially inward from the rim 35, and a groove which is open radially outwardly in the sealing rim 22 of the transfer member 20. The shape of this closure is such that when the transfer member 20 is set into the housing 30, the coupling surface 21 of the transfer member 20 is pressed firmly against the end surface 29 of the mounting plate 41, so that the resistance to heat transfer between these two parts is small.

In order that the housing 30 can be set on a smooth surface with the container 10 projecting upward above it, the lid 31 is provided with feet 36. After the food has been warmed, the housing 30 can also be placed on the table in this position with the heat-transfer member still attached.

Then as soon as the transfer member 20 has cooled sufficiently, the bayonet closure 23, 34 is opened and any food remnants adhering to the transfer vanes 25'-25''' can be rinsed off or the transfer member 20, together with the sealing ring 15, can be put into a dishwasher.

In a second embodiment of the invention now described with reference to FIGS. 5 and 6, the sealing rim 22 by which the transfer member 20 is attached to the screw-thread 13 of the container 10 is not constructed in one piece with the actual heat-transferring parts, but rather is moulded as a separate plastics part. The end plate of the transfer member 20, the outer contour of which is basically circular, is snapped into a groove with a bearing surface 28 as shown in FIG. 5. There is a degree of play in this seating, so that it is easy to wash food fragments out of the gap between the metallic element and the surrounding plastics part. It is also possible, of course, for the plastics part to be moulded or injected onto the metal part.

In this embodiment of the invention the bayonet closure, consisting of the tongue 34 and the corresponding groove 23, is formed between the plastics part of the transfer member 20 and the housing rim 48.

To facilitate handling of the whole apparatus, consisting of the housing 30 and attached transfer member 20, a knurled surface 49 is provided on the outside of the sealing rim 22. To separate the housing 30 from the transfer member 20, the feet 36-36'', also present in this embodiment on the rim 48 of the housing 30, are elongated and jut outward. At the same time, the feet 36-36'' provide a secure basis on which to rest the apparatus. This construction ensures that on the one hand the apparatus as a whole can be appropriately handled (by the knurling 49) while on the other hand it is easy to detach the housing 30 from the transfer member 20.

In any case, however, the upper edge of the metal part of the transfer member 20 is made wide enough, that is extends far enough radially, to ensure a tight seal between the upper edge of the container 10 and the metal part or its bearing surface 26. In this way the contents of the container 10 cannot come into contact with the housing 30, specifically not with the end surface 29 of the mounting plate 41.

To attach the mounting plate 41 to the floor 38 of the housing 30, two claws 32, 32' are again provided, but here they are straight in shape. Furthermore, retaining ridges 47, 47' are positioned on the floor 38 to stabilize the mounting plate 41 in the direction not covered by the claws 32 32'.

Figure 7:
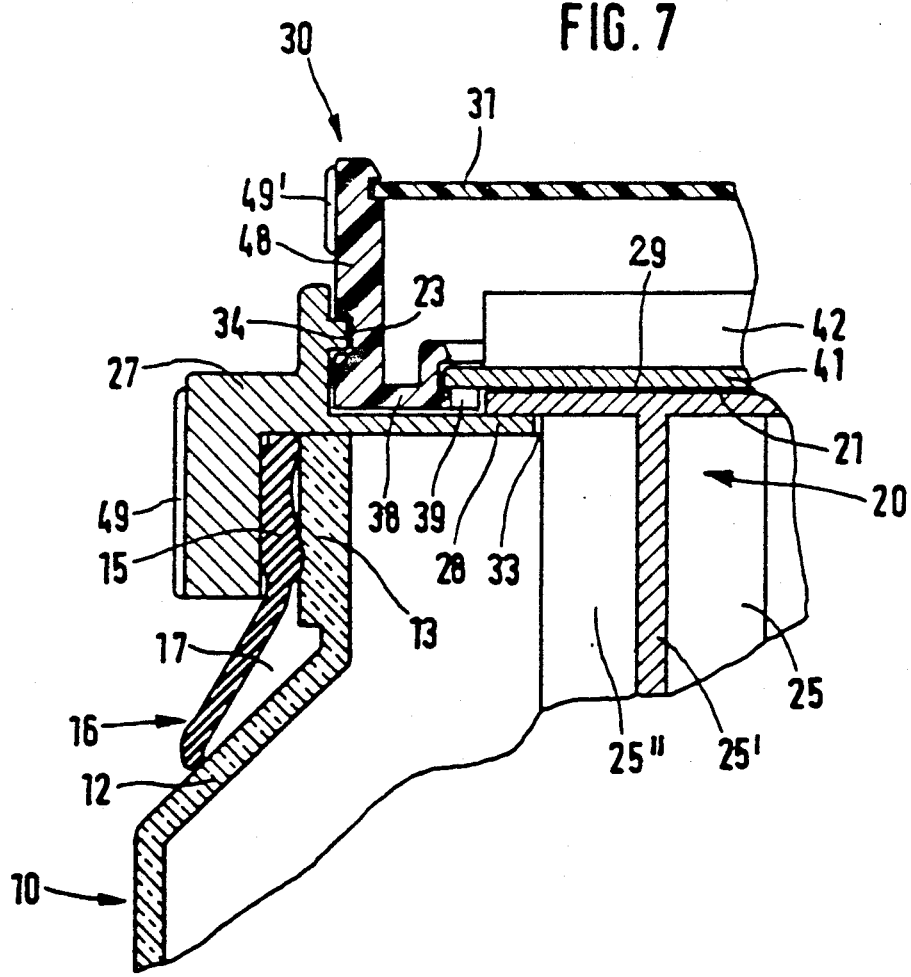
FIG. 7 is a partial longitudinal sectional view of a third embodiment of the invention.

In the third embodiment of the invention shown in FIG. 7 a separate outer ring 27 is provided, by means of which the transfer member 20 is attached to the housing 30 and the coupling surface 21 of the transfer member 20 is pressed against the end surface 29 of the mounting plate 41. For this purpose the outer ring 27 comprises a disk-shaped bearing surface 28 with a central hole 33. The dimensions of the central hole 33 are such that there is relatively narrow clearance between the edges of the vanes 25'-25''' and the opening 33. The transfer member 20 is thereby centered with respect to the outer ring 27.

The bayonet closure elements 23, 34 are formed in the rim 48 of the housing 30 and in an upward projection of the outer ring 27.

Figure 6:
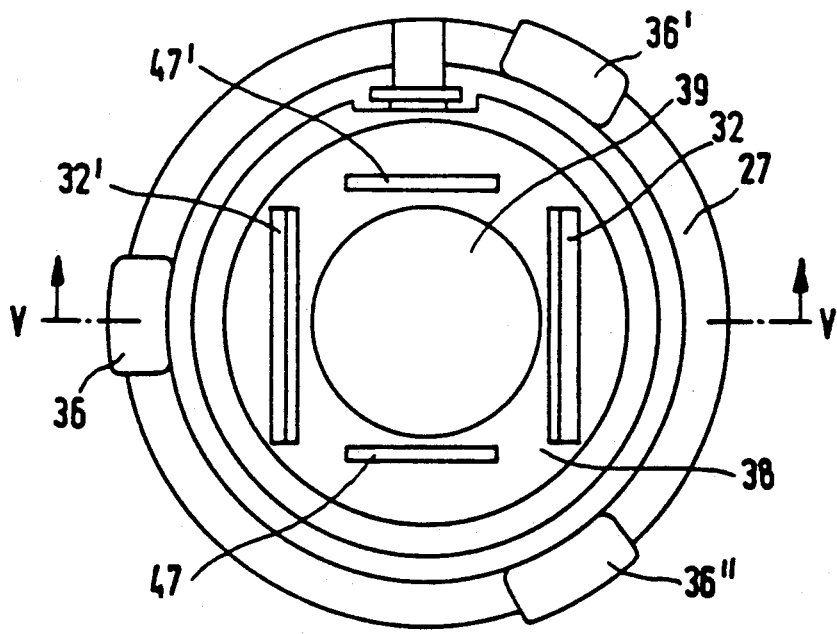
FIG. 6 is a view of a housing along the line VI—VI in FIG. 5 but without the lid of the housing and without a heating unit.

The two embodiments shown in FIGS. 5 to 7 are preferably adopted when the precooked-food warmer is designed for use with containers 10 of different shapes and diameters.

Another feature of the embodiment shown in FIG. 7, which can of course also be applied in the preceding embodiments, lies in the special shape of the sealing ring 15. It comprises a sealing lip 16, which expands downward like an inverted funnel, so that it rests on a shoulder 12 of a container 10 as shown in FIG. 7. A chamber or space 17 is thereby formed between the sealing lip 16 and the outer surface of the container 10. If the contents of the container overflow during warming, the leaked food remnants are retained in the space 17.

To facilitate handling, knurled surfaces are also provided in the embodiment shown in FIG. 7, i.e., knurled surface 49 on the outer ring 27 and 49' on the rim 48 of the housing.

The foregoing detailed description has been given for clearness of understanding only, and no unnecessary limitations should be understood therefrom, as modifications will be obvious to those skilled in the art.

What is claimed is:

1. A precooked-food warmer for baby and diet food, contained in an openable, rigid container, comprising:
   a housing adapted for mounting on the container;
   an electrical heating unit located within the housing;
   connectors adapted to supply energy to the heating unit;
   heat-conducting means to transfer heat from the heating unit to liquid or semi-liquid food in the container; and
   a transfer member formed of a rigid, heat-conducting material immersible in the liquid or semi-liquid food and detachable from the heating unit;
   said transfer member including a central section and a plurality of sword-like sections of large surface area, said sections projecting in a star-shaped array from the central section with a free end of the transfer member immersible in the liquid or semi-liquid food and the shape of the central section tapering toward the free end.

2. A precooked-food warmer as claimed in claim 1, wherein said transfer member has a coupling surface and said heating unit has a corresponding surface against which the coupling surface is placed so that both surfaces are in contact over a large area.

3. A precooked-food warmer as claimed in claim 1, wherein said housing is constructed of a material with low thermal conductivity and said heating unit is located within said housing such that none of the heatable parts of said heating unit projects beyond the external contour defined by said housing.

4. A precooked-food warmer as claimed in claim 1, wherein said heating unit includes at least one PTC element fastened to a mounting plate.

5. A precooked-food warmer for baby and diet food, which is contained in an openable, rigid container, comprising:
   a housing adapted for mounting on the container;
   an electrical heating unit located within the housing;
   said housing including a closed interior space with a floor having an opening, and said heating unit defining an end surface fastened to the floor in the interior space of the housing so that the opening is substantially sealed shut by the end surface;
   said housing including claws, with said heating unit inserted into said claws;
   connectors adapted to supply energy to the heating unit;
   heat-conducting means to transfer heat from the heating unit to liquid or semi-liquid food in the container; and
   a transfer member formed of a rigid, heat-conducting material immersible in the liquid or semi-liquid food and detachable from the heating unit.

6. A precooked-food warmer as claimed in claim 5, wherein said housing includes a wall having a projecting edge, and including a lid closing one end of said housing.

7. A precooked-food warmer as claimed in claim 5, wherein said housing is constructed of a material with low thermal conductivity and said heating unit is located within said housing such that none of the heatable parts of said heating unit projects beyond the external contour defined by said housing.

8. A precooked-food warmer as claimed in claim 5, wherein said heating unit includes at least one PTC element fastened to a mounting plate.

9. A precooked-food warmer for baby and diet food, contained in an openable, rigid container, comprising:
   a housing adapted for mounting on the container;
   an electrical heating unit located within the housing;
   connectors adapted to supply energy to the heating unit;
   heat-conducting means to transfer heat from the heating unit to liquid or semi-liquid food in the container;
   a transfer member formed of a rigid, heat-conducting material immersible in the liquid or semi-liquid food and detachable from the heating unit;
   a plurality of holding devices for attaching the housing and the transfer member to the container to seal said container closed;
   said holding devices including a sealing rim extending from the transfer element and a sealing ring positioned within and adjacent said sealing rim, said container having a screw thread, and said sealing ring placed around said screw thread; and
   connecting devices on said housing and transfer member for locking said housing and transfer member together.

10. A precooked-food warmer as claimed in claim 9, wherein said sealing rim and said transfer member comprise a one piece unit formed of heat-conducting material, and wherein said housing a section overlapping the outside of said sealing rim.

11. A precooked-food warmer as claimed in claim 9, wherein said housing includes an outer ring covering said sealing rim so that said housing, transfer member and container are connected to each other.

12. A precooked-food warmer as claimed in claim 11, wherein said outer ring is securely fastened to said transfer member.

13. A precooked-food warmer as claimed in claim 9, wherein said container includes a shoulder, and wherein an elongated sealing lip is formed on said sealing ring so that said elongated sealing lip projects from the screw thread of said container toward said shoulder on which it is firmly seated, thus defining space between said lip and said container.

14. A precooked-food warmer as claimed in claim 9, wherein said housing is constructed of a material with low thermal conductivity and said heating unit is located within said housing such that none of the heatable parts of said heating unit projects beyond the external contour defined by said housing.

15. A precooked-food warmer as claimed in claim 9, wherein said heating unit includes at least one PTC element fastened to a mounting plate.

* * * * *